Jan. 23, 1951 — H. D. KADZ — 2,539,020

CLUTCH ADJUSTING MECHANISM

Original Filed Aug. 31, 1943

Harald D. Kadz
INVENTOR.

BY
ATTORNEY

Patented Jan. 23, 1951

2,539,020

UNITED STATES PATENT OFFICE 2,539,020

CLUTCH ADJUSTING MECHANISM

Harald D. Kadz, Glendale, Calif., assignor to Kay-Brunner Steel Products, Inc., a corporation of Delaware Original application August 31, 1943, Serial No. 500,654. Divided and this application March 13, 1947, Serial No. 734,460

1 Claim. (Cl. 192—111)

This invention relates in general to improvements in clutches, and in particular to mechanisms for making wear-compensating adjustments in clutches of the type shown in my pending application for Winches, Serial No. 500,654, filed Aug. 31, 1943, now Patent Number 2,417,502, issued March 18, 1947, of which the present application is a division.

One of the objects of this invention is to provide an improved clutch adjusting mechanism which is comparatively simple as to construction, small, compact, and subject to ready operation for accurately adjusting the clutch elements to compensate for wear and to vary the operational characteristics of the clutch.

Another object of this invention is to provide a wear-compensating adjustment mechanism of the character described, wherein a simple form of adjusting member is conveniently arranged around one of the end bearings for the main shaft of the clutch in coaxial relation to the shaft, as well as in connected and coaxial relation to one of the screw members mounted on said shaft and forming a part of the operating means by which the clutch is clutched and declutched, thereby eliminating the use of special brackets, bearings, housings, or like mountings for the adjusting means and providing a compact adjusting unit which takes up comparatively little space and is located so that it may be readily operated.

Another object of this invention is to provide clutch adjusting mechanism of the character described in which is embodied a novel clamping means, which surrounds the adjusting member, and is readily operable to releasably hold said member to maintain particular adjustments.

Figure 1:
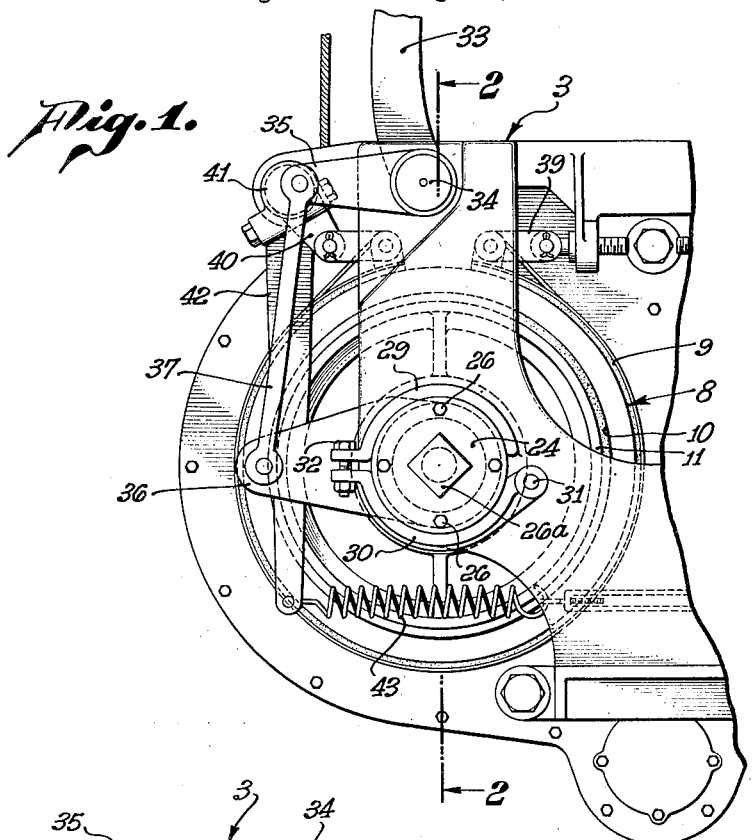

With the foregoing objects in view, together with such other objects and advantages as may subsequently appear, the invention resides in the parts and in the combination, construction and arrangement of parts hereinafter described and claimed, and illustrated by way of example in the accompanying drawings, in which, Fig. 1 is a fragmentary elevational view of a clutch in which is embodied adjusting mechanism in accordance with this invention.

Figure 2:
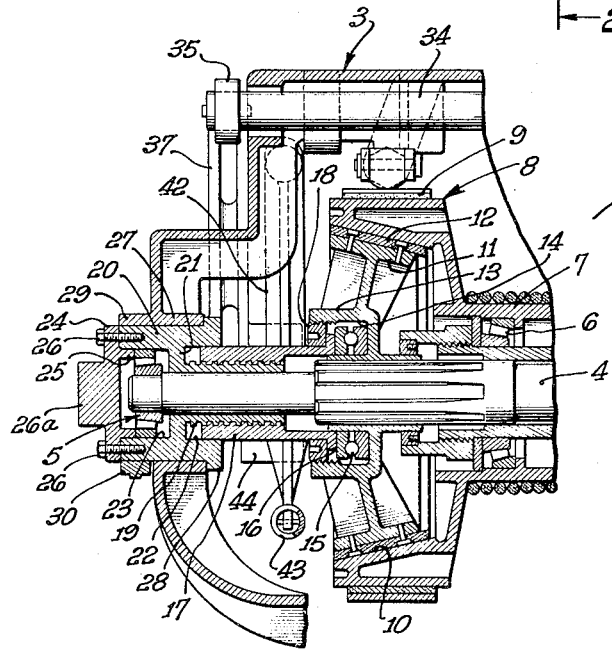

Fig. 2 is a vertical sectional view taken on the line 2—2 of Fig. 1, showing in detail the construction and arrangement of the adjusting mechanism hereof.

As shown in the accompanying drawing, my invention is embodied in a combined clutch and brake unit such as employed in the winch forming the subject matter of the aforesaid pending application. This clutch-brake unit includes a frame 3 in which is mounted power driven shaft 4 supported at its ends by means of similar bearings 5 only one of which is here shown.

Mounted on the shaft 4 on bearings such as the one 6 here shown, is a winch drum 7 which supports as an integral part thereof combined driven clutch member and brake drum 8. A brake band 9 surrounds the drum 8 for application thereto to control the speed of the winch drum when the clutch is declutched. The inner periphery of the drum 8 is formed with a conical clutch surface 10 for cooperation with a driving clutch member 11 of conical form and splined on the shaft 4 for movement into and out of position in which a lining 12 riveted thereto makes a frictional driving contact with the clutch surface 10, whereby the winch drum 7 may be driven and released in the usual manner.

The hub 13 of the cone 11 is formed with an annular pocket 14 containing a bearing 15 for the flanged end 16 of a rotary, internally screw threaded, clutch-operating collar 17 surrounding the shaft 4. A nut 18 is screwed into the pocket to hold the flanged end 16 in rotatable connection with the hub 13.

Means is provided for moving the collar 17 axially of the shaft 4 when rotated, so that the clutch cone may be moved into and out of clutching position. This means also forms a part of the wear-compensating adjustment mechanisms hereof, and, as here shown, includes an externally screw-threaded sleeve 19 mounted on the shaft 4 in threaded engagement with the collar 17. The outer end of the sleeve 19 extends into a cylindrical adjusting member 20 mounted on the frame 3, and is joined thereto by means of an annular web 21 which forms in the member pockets 22 and 23. The pocket 22 slidably receives the outer end of the collar 17 which is axially adjustable therein, whereas the pocket 23 houses the bearing 5 for the shaft 4 which latter turns freely within the sleeve 19. A cap 24 closes the pocket 23 and has an annular flange 25 seated in the pocket 23 and retaining the bearing 5 in place. Cap screws 26 hold the cap 24 in place. A squared projection 26a on the cap 24 facilitates the application of a wrench thereto for turning the member 20 in its frame-carried bearing 27, whereby the sleeve 19 will be turned and by such turning move the collar 17 axially for setting the clutch cone 11 to compensate for wear of the clutch.

The bearing 27 on the frame 3 which supports the adjusting member 20, is provided as a simple annulus in integral formation with the frame, there being a flange 28 on the inner end of the member 20 abutting the bearing so as to hold the member in place. The outer end of the bearing 27 is formed as a fixed part 29 of a two part collar or clamp, the other part 30 of which is pivoted on the frame 3 as at 31. Corresponding ends of the parts 29 and 30 are adapted to be adjustably secured to one another by means of a bolt 32 which on being tightened will cause the clamp to grip and hold the adjusting member 20 against turning.

Any suitable means may be provided for turning the collar 17 for clutching and declutching operation, which means as is customary in this art also operates to tighten the brake band 9 around the drum 8 when the clutch and winch drum are released and to release the brake band when the clutch is engaged to drive the winch drum. This means forms no part of the present invention and is, therefore, not completely shown. As here shown the clutch operating means includes a lever 33 fixed to a rock shaft 34 on the frame 3. Crank arms 35 and 36 on the shaft 34 and collar 17 respectively, are joined by a link 37 so that on moving the lever in one direction the collar 17 will be turned and, through threaded contact with sleeve 19, moved axially so as to shift the clutch cone 11 into clutching engagement with the clutch surface 10 of the clutch drum 8 and thus drive the winch drum 7. Movement of the lever in the opposite direction will declutch the clutch cone.

One end of the brake band 9 is connected to an adjusting means 39, whereas the other end of said band is connected to a crank arm 40 on a stub shaft 41 on the frame 3. A rocker arm 42 is fixed at one end to the shaft 41 and at its other end is connected to a spring 43 which urges the arm 42 in a direction for constricting the brake band. The arm 42 is rocked by means of cam 44 or the crank arm 36 of the collar 17, the cam bearing against a roller 45 on crank arm 42. Thus it will be clear that when operating the lever 70 to move the cone 11 against the drum 8 for operatively connecting the shaft 4 for driving the winch drum 7, the crank arm 36 on the collar 17 is moved upwardly, and the cam 44 causes the rocker arm 42 to move and release the brake band. According as the clutch is clutched and declutched the brake band 9 is concurrently moved into and out of braking contact with the drum 8.

When it is desired to set the clutch cone to vary the operational characteristics of the clutch, or to compensate for wear of the clutch elements it is only necessary to apply a suitable wrench to the cap 24 and exert a turning force on the member 20 after first loosening the bolt 32 and the pivoted part 30 of the clamp around member 20. As the member 20 is turned the sleeve 19 is likewise turned and will shift the collar 17 one way or the other depending on the direction of turning of the member 20 and sleeve 19. In this manner the cone 11 may be quickly and easily adjusted and then as readily set in adjusted position by tightening the bolt 32 and thus clamping the member 29 against turning.

It is important to note that by having the sleeve 19 formed integral with the pocketed cylindrical member 20 which supports the bearing 5 for the drive shaft and is mounted in the frame 3 and constructed and arranged as here shown, a comparatively simple and most effective clutch adjusting means is provided with fewer parts, in a much more compact arrangement than heretofore provided in clutches, and has the advantage of making the adjusting means of easier access and operation than heretofore.

Although I have herein shown and described only one form of clutch adjusting mechanism embodying my invention, it is to be understood that various changes and modifications may be made therein without departing from the spirit of my invention and the spirit and scope of the appended claim.

I claim:

In a clutch; a frame; a driving shaft supported by said frame; a driven member supported in said frame; a driving member splined on said shaft for movement into and out of driving contact with said driven member; an internally screw-threaded collar connected to said driving member and being rotatable around and movable axially of said shaft; an externally screw-threaded sleeve threaded to said collar and through which said shaft extends and is rotatable relative thereto; a cylindrical adjusting member to which said sleeve is fixed; a bearing on said frame in which said member is adapted to be turned for moving said collar axially and changing the setting of said driving member; said cylindrical member having said sleeve formed integral therewith so as to provide pockets in opposite ends thereof; one of said pockets slidably receiving said collar; a bearing for said shaft in the other of said pockets; a cap secured to said cylindrical member for closing said other pocket, and affording the application of a tool thereto for turning said cylindrical member; and a clamp carried in part by the bearing on said frame, for releasably holding said cylindrical member against turning.

HARALD D. KADZ.

REFERENCES CITED

The following references are of record in the file of this patent:

UNITED STATES PATENTS

| Number | Name | Date |
|---|---|---|
| 587,208 | Hunt | July 27, 1897 |
| 2,413,081 | Shaeffer | Dec. 24, 1946 |

FOREIGN PATENTS

| Number | Country | Date |
|---|---|---|
| 443,045 | Germany | Apr. 16, 1927 |